US010789593B2

(12) United States Patent
Zhai et al.

(10) Patent No.: US 10,789,593 B2
(45) Date of Patent: Sep. 29, 2020

(54) BIOMETRIC FEATURE DATABASE ESTABLISHING METHOD AND APPARATUS (71) Applicant: Alibaba Group Holding Limited, George Town (KY)

(72) Inventors: Fen Zhai, Shanghai (CN); Chunlei Gu, Shanghai (CN); Lei Lu, Shanghai (CN); Yanghui Liu, Shanghai (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 93 days.

(21) Appl. No.: 16/048,573

(22) Filed: Jul. 30, 2018

(65) Prior Publication Data
US 2019/0034935 A1 Jan. 31, 2019

(30) Foreign Application Priority Data

Jul. 31, 2017 (CN) .......................... 2017 1 0637558

(51) Int. Cl.
*G06Q 20/40* (2012.01)
*G06K 9/00* (2006.01)
(Continued)

(52) U.S. Cl.
CPC ......... *G06Q 20/40145* (2013.01); *G06F 7/08* (2013.01); *G06F 16/51* (2019.01);
(Continued)

(58) Field of Classification Search
CPC .......................... G06Q 20/40; G06Q 20/40145
(Continued)

(56) References Cited

U.S. PATENT DOCUMENTS 6,507,912 B1 1/2003 Matyas, Jr. et al.
7,099,495 B2 8/2006 Kodno et al.
(Continued)

FOREIGN PATENT DOCUMENTS

CN 101689235 7/2012
CN 102842042 12/2012
(Continued)

OTHER PUBLICATIONS

Adesuyi et al., "Secure authentication for mobile banking using facial recognition," IOSR Journal of Computer Engineering, 2013,10(3):51-59 (Year: 2013).*
(Continued)

*Primary Examiner* — Hai Tran
(74) *Attorney, Agent, or Firm* — Fish & Richardson P.C.

(57) ABSTRACT

A usage frequency attribute is determined for each biometric feature in a biometric feature database. The usage frequency attribute indicates a matching success frequency of matching the biometric feature to a user having the biometric feature. The biometric features of the user are sorted in descending order of the usage frequency attribute. The sorting is based on a descending order of the usage frequency attributes for a given user. The biometric features in the biometric feature database are stored in descending order. The storing includes providing prioritized access to the biometric feature having a highest value of the usage frequency attribute so that the biometric feature is selected first in response to a request for the biometric feature of the user.

20 Claims, 6 Drawing Sheets (51) Int. Cl.
*G06F 16/583* (2019.01)
*G06F 16/51* (2019.01)
*G06F 7/08* (2006.01)
*H04L 29/06* (2006.01)

(52) U.S. Cl.
CPC ..... *G06F 16/5838* (2019.01); *G06K 9/00288* (2013.01); *G06K 9/00926* (2013.01); *H04L 63/0861* (2013.01)

(58) Field of Classification Search
USPC .......................................................... 705/44
See application file for complete search history.

(56) References Cited

U.S. PATENT DOCUMENTS

| | | | |
|---|---|---|---|
| 8,635,165 | B2 | 1/2014 | Beenau et al. |
| 8,787,624 | B2 | 7/2014 | Hama et al. |
| 2007/0177766 | A1 | 8/2007 | Kasahara et al. |
| 2007/0252001 | A1 | 11/2007 | Kail et al. |
| 2007/0290800 | A1 | 12/2007 | Fuller |
| 2009/0125401 | A1 | 5/2009 | Beenau et al. |
| 2012/0230551 | A1 | 9/2012 | Hama et al. |
| 2016/0089052 | A1 | 3/2016 | Cho et al. |
| 2018/0014731 | A1 | 1/2018 | Otsuka et al. |

FOREIGN PATENT DOCUMENTS

| | | |
|---|---|---|
| CN | 104240347 | 12/2014 |
| CN | 105205365 | 12/2015 |
| CN | 105631278 | 6/2016 |
| CN | 105989333 | 10/2016 |
| CN | 106203319 | 12/2016 |
| CN | 106507301 | 3/2017 |
| CN | 106650657 | 5/2017 |
| JP | 2005149344 | 6/2005 |
| TW | I634452 | 9/2018 |

OTHER PUBLICATIONS

Schumacher [online], "MySQL—A Practical Look at the MySQL Query Cache," Jul. 2017, [retrieved on Oct. 22, 2018], etrieved from: URL, 8 pages (Year: 2017).*

No Author [online], "Understanding MySQL Query Cache—Taos," Apr. 2013, [retrieved on Oct. 22, 2018], retrieved from: JRL, 6 pages (Year: 2013).*

Wikipedia.org [online], "Cache replacement Policies," Jun. 9, 2017, retrieved on Nov. 20, 2019, retrieved from JRL, 9 pages (Year: 2017).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in International Application No. PCT/US2018/044370, dated Nov. 20, 2019, 17 pages.

Wikipedia.org [online], "Cache replacement Policies," Jun. 9, 2017, retrieved on Nov. 20, 2019, retrieved from URL<https://en.wikipedia.org/wiki/Cache_replacement_policies>, 9 pages.

Adesuyi et al., "Secure authentication for mobile banking using facial recognition," IOSR Journal of Computer Engineering, 2013, 10(3):51-59.

International Search Report and Written Opinion in International Application No. PCT/US2018/044370, dated Oct. 30, 2018, 17 pages.

No Author [online], "Understanding MySQL Query Cache—Taos," Apr. 2013, [retrieved on Oct. 22, 2018], retrieved from: URL<https://www.taos.com/understanding-mysql-query-cache/>, 6 pages.

Schumacher [online], "MySQL—A Practical Look at the MySQL Query Cache," Jul. 2017, [retrieved on Oct. 22, 2018], retrieved from: URL<https://web.archive.org/web/20170717190840/http://download.nust.na/pub6/mysql/tech-resources/articles/mysql-query-cache.html>, 8 pages.

\* cited by examiner

BIOMETRIC FEATURE DATABASE ESTABLISHING METHOD AND APPARATUS

This application claims priority to Chinese Patent Application No. 201710637558.4, filed on Jul. 31, 2017, which is hereby incorporated by reference in its entirety.

TECHNICAL FIELD

The present disclosure relates to the field of computer technologies, and in particular, to a biometric feature database constructing method and apparatus.

BACKGROUND

In the biometric identification technology, a computer is used to identify a user based on physiological features (such as fingerprint, iris, physiognomy, or DNA) or behavioral features (such as the user's gait or keystroke habit). For example, fingerprint recognition, facial recognition, iris recognition, etc. are all biometric identification.

When the biometric identification technology is used to identify a user, a feature can usually be stored in a biometric feature database. Thus, a biometric feature of the user generated during initial registration is stored in the database. When identification is performed, the biometric feature of the user that is identified can be compared with features in the biometric feature database to identify the user.

SUMMARY

In view of the above, one or more implementations of the present specification provide a biometric feature database constructing method and apparatus to accelerate biometric identification.

The one or more implementations of the present specification are implemented by using the following technical solutions:

According to a first aspect, a biometric feature database constructing method is provided, and the method includes the following: obtaining a usage frequency attribute of each biometric feature in a biometric feature database, where the usage frequency attribute is used to indicate matching success frequency of the biometric feature; and arranging the biometric features in descending order of matching success frequency based on the usage frequency attribute, so a biometric feature with higher frequency is preferably used to perform recognition, matching, and comparison.

According to a second aspect, a facial recognition payment method is provided, and the method includes the following: obtaining a facial feature that is recognized of a payer; comparing facial features in a facial feature database with the facial feature that is recognized based on feature ranks, where the feature ranks are obtained after the facial features are arranged based on usage frequency attributes of the facial features, and a facial feature with higher usage frequency is preferably used to perform matching and comparison; and when a matched facial feature is obtained, performing payment by using a payment account corresponding to the facial feature.

According to a third aspect, a biometric feature database constructing apparatus is provided, and the apparatus includes the following: a parameter acquisition module, configured to obtain a usage frequency attribute of each biometric feature in a biometric feature database, where the usage frequency attribute is used to indicate matching success frequency of the biometric feature; and a feature arrangement module, configured to arrange the biometric features in descending order of matching success frequency based on the usage frequency attribute, so a biometric feature with higher frequency is preferably used to perform recognition, matching, and comparison.

According to a fourth aspect, a data processing device is provided. The device includes a memory, a processor, and a computer instruction, the computer instruction is stored in the memory and can run on the processor, and the processor executes the instruction to implement the following steps: obtaining a usage frequency attribute of each biometric feature in a biometric feature database, where the usage frequency attribute is used to indicate matching success frequency of the biometric feature; and arranging the biometric features in descending order of matching success frequency based on the usage frequency attribute, so a biometric feature with higher frequency is preferably used to perform recognition, matching, and comparison.

According to the biometric feature database constructing method and apparatus in the one or more implementations of the present specification, the biometric features are arranged in descending order of matching success frequency. If a biometric feature is frequently successfully matched or is recently successfully matched, the feature may be successfully matched during subsequent matching. During feature recognition, the comparison is preferably performed among features with higher frequency to quickly find a matched feature.

BRIEF DESCRIPTION OF DRAWINGS

To describe the technical solutions in one or more implementations of the present specification, or in the existing technology more clearly, the following briefly describes the accompanying drawings for describing the implementations or the existing technology. Apparently, the accompanying drawings in the following description merely show some implementations described in the one or more implementations of the present specification, and a person of ordinary skill in the art can still derive other drawings from these accompanying drawings without creative efforts.

DESCRIPTION OF EMBODIMENTS

To make a person skilled in the art understand the technical solutions in one or more implementations of the present specification better, the following clearly and completely describes the technical solutions in the one or more implementations of the present specification with reference to the accompanying drawings. Apparently, the described implementations are merely some but not all of the implementations of the present specification. Other implementations obtained by a person of ordinary skill in the art based on the one or more implementations of the present specification without creative efforts shall fall within the protection scope of the present disclosure.

Biometric identification can be performed to identify a user. In an actual application, a biometric feature database including biometric features of a plurality of users can be used. When identification is performed, a biometric feature of a user that is identified can be compared with features in the biometric feature database to obtain an identity of the user. During the comparison, the biometric feature of the user can be compared with the features in the biometric feature database one by one based on feature ranks. A biometric feature database constructing method provided by one or more implementations of the present specification can be used to arrange the biometric features in the biometric feature database, so a matched feature can be found more quickly when the biometric feature is compared with the arranged features one by one.

Figure 1:
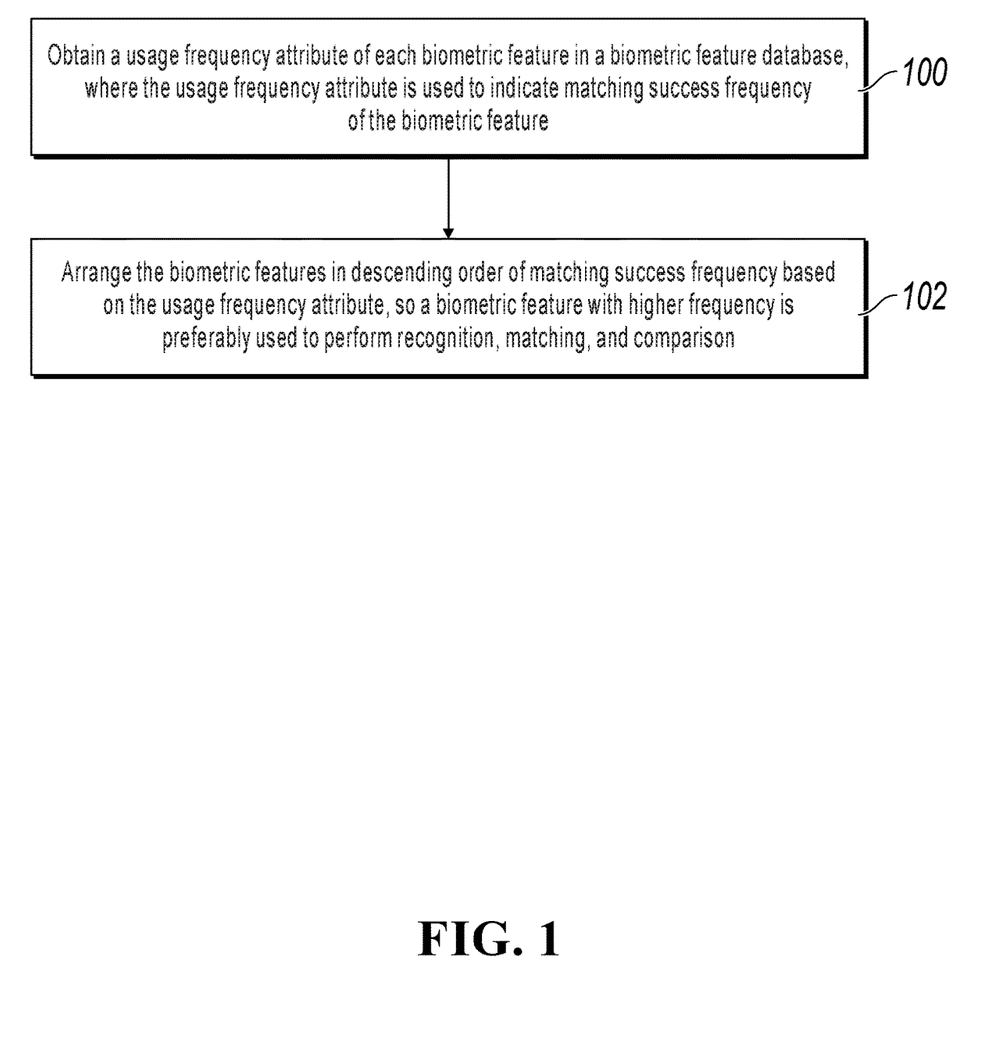
FIG. 1 is a flowchart illustrating a biometric feature database constructing method, according to one or more implementations of the present specification.

FIG. 1 illustrates a biometric feature database constructing method in an example. The method can include the following steps.

Step 100: Obtain a usage frequency attribute of each biometric feature in a biometric feature database, where the usage frequency attribute is used to indicate matching success frequency of the biometric feature.

Step 102: Arrange the biometric features in descending order of matching success frequency based on the usage frequency attribute, so a biometric feature with higher frequency is preferably used to perform recognition, matching, and comparison.

In the feature arrangement method in this example, a feature with higher matching success frequency can be arranged in the front, so that comparison can be preferably performed on this feature in a feature recognition process. For example, the feature with higher matching success frequency can be a feature that has recently been successfully matched with a feature that is recognized, or it can be a feature that is frequently successfully matched with the feature that is recognized. If a biometric feature is frequently successfully matched or is recently successfully matched, the feature may be successfully matched during subsequent matching. During feature recognition, the comparison is preferably performed among features with higher frequency to quickly find a matched feature.

In the following example of facial recognition in biometric identification, facial recognition payment is used as an example for description. However, it can be understood that another type of biometric identification can also be applied to the biometric feature database constructing method in one or more implementations of the present specification, and a biometric feature can be applied to a plurality of application scenarios, for example, facial recognition can also be applied to a service other than payment.

Facial recognition can be applied to offline payment. For example, during credit card payment or QR code payment, a user needs to carry a credit card or a smartphone and interact with a machine. For example, during QR code payment, the user needs to take a smartphone to open a payment application, and a POS machine of a merchant scans a QR code, so payment is completed. These payment means are relatively complicated.

Facial recognition payment means applying facial recognition to payment, and its concept has existed for a long time. Facial recognition has become highly accurate after years of development, but careful consideration should be given if facial recognition is to be used for payment. Because accuracy and speed need to be very high during facial recognition payment in the offline payment scenario, facial recognition has not been used yet in an actual payment scenario. If the facial recognition payment is applied to the offline payment scenario, the user does not need to carry a credit card or a smartphone, thereby accelerating payment. The following example can provide a facial recognition payment method to satisfy performance needs of a payment scenario on facial recognition payment.

Figure 2:
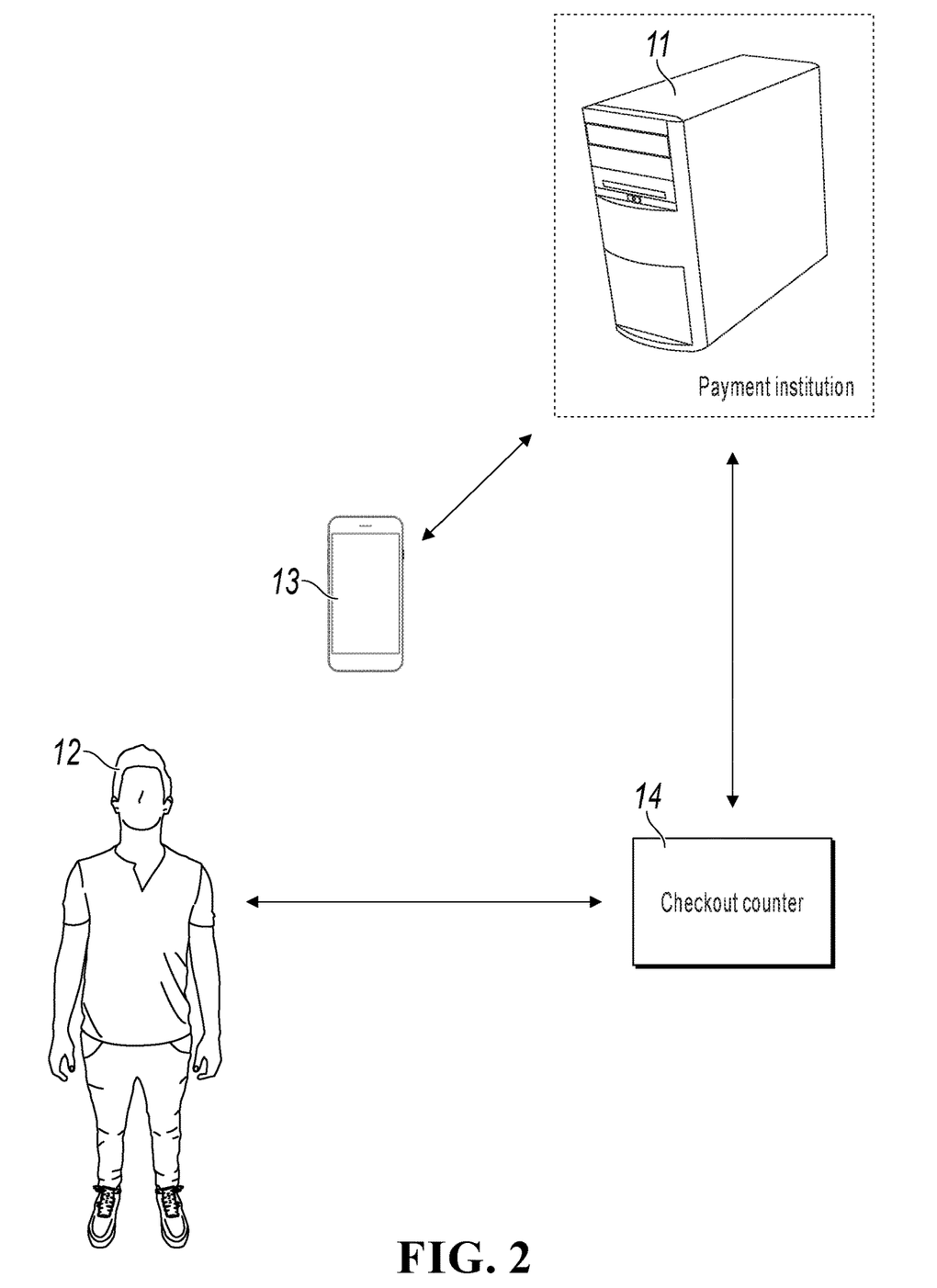
FIG. 2 is a diagram illustrating an application system of facial recognition payment, according to one or more implementations of the present specification.

FIG. 2 illustrates a diagram of an application system of facial recognition payment. As shown in FIG. 2, the system can include a data processing device 11 of a payment institution, an intelligent terminal 13 of a user 12, and a checkout counter 14 of a merchant. The data processing device 11 can be a background server of the payment institution. In this example, the user 12 is one that pays and can be referred to as a payer. The intelligent terminal 13 can be a smartphone.

Figure 3:
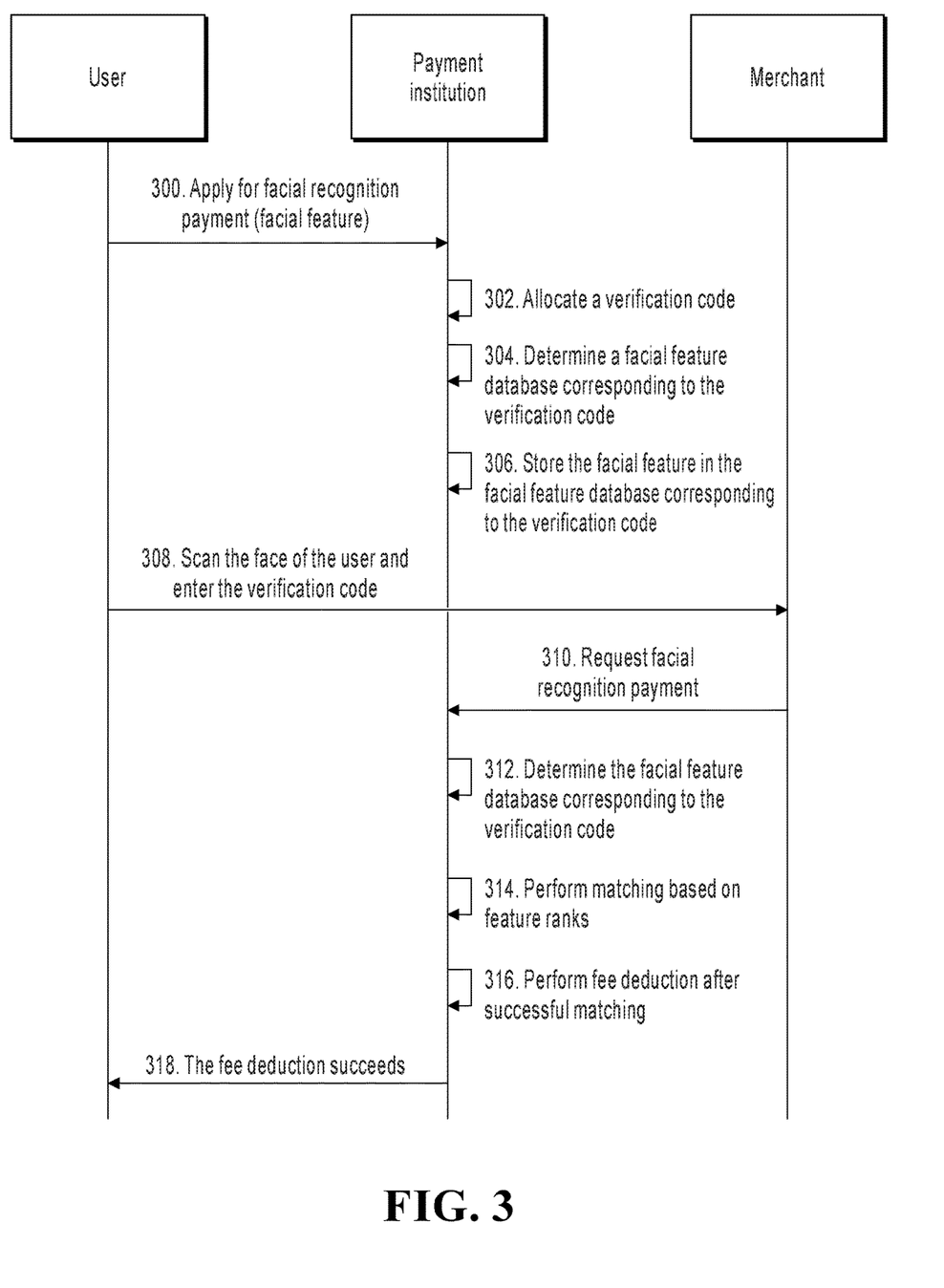
FIG. 3 is a flowchart illustrating a facial recognition payment method, according to one or more implementations of the present specification.

With reference to the procedure shown in FIG. 2 and FIG. 3, how the user 12 activates a facial recognition payment function and pays by using the facial recognition payment function is described. As shown in FIG. 3, the procedure can include the following steps.

Step 300: The user requests, by using the intelligent terminal, the payment institution to activate a facial recognition payment function, and sends a facial feature and a payment account to the payment institution.

For example, the payer 12 can apply for facial recognition payment activation on the smartphone 13 by using a payment institution client on the phone, and send a payment account and a facial feature of the user to the payment institution. The payment account can help the payment institution to identify the user, and the facial feature can be, for example, shot by the user by using a camera of the mobile phone. The facial feature and the payment account can be received by the data processing device 11 of the payment institution.

In the present step, the payment institution can further verify the facial feature. For example, matching can be performed with a public security network. If the matching fails, facial recognition payment cannot be activated, so no facial feature of another user is received. If the matching succeeds, step 302 is performed.

Step 302: The payment institution constructs a mapping relationship between the facial feature and the payment account, and allocates a corresponding verification code to the user.

In this example, the verification code can be in a plurality of forms. For example, the verification code can be digits 0 to 9, or the verification code can be a combination of digits and letters. For example, it can be extended to hexadecimal 0 to 9 and A to F. Different verification codes can be allocated to different payers. For example, when a payer U1 activates facial recognition payment, a verification code 000011 can be allocated to the payer U1. When a payer U2 activates facial recognition payment, a verification code 111235 can be allocated to the payer U2.

In addition, the payment institution can obtain a verification code to be allocated to the payer from a verification code set, and the verification code set includes a plurality of verification codes to be allocated to a payer set. When the number of payers in the payer set increases, the number of digits of the verification code allocated to the payer also increases. For example, initially, both the number of registered payers and the number of digits of the verification code in the verification code set are small, and the verification code can usually be a six-digit verification code. As the number of registered payers increases, the original verification codes may be insufficient, and the number of digits of the verification code can be increased. That is, multi-digit verification codes with hexadecimal 0 to 9 and A to F are allocated to users.

Step 304: The payment institution determines a facial feature database corresponding to the verification code.

In this example, different verification codes can be allocated to different people, and different verification codes are mapped to different facial feature databases, thereby separately storing facial features of different people.

In an example, the data processing device 11 of the payment institution can use a hash mapping algorithm to generate a hash value by performing a hash function operation on a verification code, and determine a facial feature database corresponding to the hash value as a facial feature database corresponding to the verification code.

For example, if a target hash value is $R_1R_2R_3$ which has three digits, and a verification code is (num1, num2, num3, num4, num5, num6) which has six digits, a hash function for calculating a hash value by using the verification code is as follows: $R_1$=num3; $R_2$=a mantissa or positive fractional part of (num2+num4+num6); and R3=a mantissa or positive fractional part of (a prime number×num1+a prime number× num5).

It is worthwhile to note that the previous hash function is merely an example, and there can be many types of hash functions. Details are not enumerated here. For example, there can be 1000 calculated hash values, and correspondingly, there are 1000 facial feature databases. A corresponding hash value is calculated by using a verification code, and a facial feature database corresponding to the hash value can be used as a facial feature database corresponding to the verification code.

Step 306: The payment institution stores the facial feature registered by the user in the facial feature database corresponding to the verification code allocated to the user.

For example, when the payer U1 activates facial recognition payment, the payment institution allocates a verification code 000011 to the payer U1. A hash value is obtained by performing hash function calculation on the verification code, and the facial feature transmitted by the payer U1 in step 300 is stored in a database corresponding to the hash value.

The user successfully activates the facial recognition payment function by performing steps 300 to 306. In addition, different verification codes are allocated to different users, and the facial features of different users can be stored in different facial feature databases, so similar facial features can be separately stored.

For example, when the payer U1 and the payer U2 activate facial recognition payment, a similarity between facial features (for example, the facial features can be facial images taken by the users by using cameras) transmitted by the payer U1 and the payer U2 to the payment institution is relatively high because of light, angle, makeup, etc. The data processing device of the payment institution can separately store the facial features of the two payers in different databases, based on different verification codes allocated to the payer U1 and the payer U2, so as to avoid confused facial feature matching when facial recognition payment is subsequently performed. However, different verification codes can also correspond to a same hash value, and consequently, the facial features of different users can also be stored in a same facial feature database.

The following describes how to apply the facial recognition payment function to perform payment. If a user is shopping in a merchant's store, during payment, the user can select a facial recognition payment function at a checkout counter 14 of the merchant when the checkout counter 14 supports facial recognition payment.

Step 308: The user enters the verification code into the checkout counter and provides a facial feature through facial recognition.

In the present step, the payer can provide the facial feature for the checkout counter of the merchant, and the facial feature can be a facial feature provided for the payment institution when facial recognition payment is activated.

Step 310: The checkout counter requests the payment institution to perform fee deduction for facial recognition payment, and sends the facial feature and the verification code of the user received in step 308.

Step 312: The payment institution determines the corresponding facial feature database based on the verification code.

For example, the payment institution can obtain, by using a hash algorithm, a hash value corresponding to the verification code based on the verification code that is provided by the payer for the checkout counter of the merchant, and obtain the facial feature database corresponding to the hash value. In addition, when receiving a payment request from the merchant, the payment institution can further verify a token for security authentication.

Step 314: The payment institution compares facial features in the facial feature database with the facial feature that is recognized based on feature ranks, where the feature ranks are obtained after the facial features are arranged based on usage frequency attributes of the facial features, and a facial feature with higher usage frequency is preferably used to perform matching and comparison.

In this example, facial features in the facial feature database can be arranged based on usage frequency attributes. For example, the usage frequency attribute can include at least one of the following attribute parameters: the number of usage times and the latest usage time. The number of usage times can be the number of successful matching times within a period of time, and the latest usage time can be a time when the facial feature has recently been successfully matched. Certainly, the previous number of usage times and the latest usage time are merely examples of the usage frequency attribute, and there may be another usage frequency attribute.

For example, the facial features are arranged based on the number of usage times and the latest usage time. The two parameters can be weighted to perform arrangement, and a recently matched facial feature with the largest number of usage times is arranged in the front of the facial feature database. For example, weighted summation can be performed on at least two attribute parameters included in the usage frequency attribute, such as the number of usage times and the latest usage time, and a value obtained through weighted summation can be referred to as a frequency attribute value. The facial features can be arranged based on the frequency attribute value. For example, if higher matching success frequency indicates a larger frequency attribute value, the facial features can be arranged in descending order of frequency attribute values. A facial feature with higher matching success frequency (for example, with the larger number of successful matching times or with the latest successful matching) is preferably used to perform matching and comparison based on the feature ranks. The facial features are sequentially matched with the facial feature that is recognized, and the facial feature that is recognized is the facial feature of the payer received in step 310.

Step 316: When a matched facial feature is obtained, the payment institution performs payment by using a payment account corresponding to the facial feature.

In this example, when the facial feature that matches the payer is searched for in a facial feature database, a facial feature with higher usage frequency is preferably used to perform matching and comparison. As such, a matched facial feature can be quickly found, and the facial recognition payment can be accelerated.

In addition, after the matched facial feature is obtained, a usage frequency attribute of the facial feature can be updated. For example, the number of usage times of the matched facial feature can be increased by one, and the latest usage time can be updated to a time when the latest matching succeeds. The data processing device of the payment institution can further rearrange the facial features in the facial feature database based on the updated usage frequency attribute to arrange a facial feature with high frequency in the front.

In addition, the payment institution can further set a single maximum or a payment limit per day for the user in facial recognition payment to control transaction risks, and it can further monitor transaction data in real time to detect a data exception and control risks.

Step 318: The payment institution feeds back a message indicating fee deduction success to the intelligent terminal of the user.

In the facial recognition payment method in this example, the facial features in the facial feature database are arranged based on face usage frequency, and the feature ranks are updated during matching, thereby accelerating facial recognition. In addition, different facial features can be separately stored in different facial feature databases based on the verification codes. For example, similar facial features corresponding to different hash values are stored in different databases to avoid an error in recognizing similar faces in facial recognition, and improve accuracy of facial recognition payment.

In the previous procedure of FIG. 3, not only different facial features are separately stored by using verification codes, but also a facial feature with high usage frequency is arranged in the front. In another example, one of the two following solutions can be used. For example, the facial features are not separately stored in different databases by using verification codes, but a facial feature with high usage frequency is arranged in the front, thereby accelerating the facial recognition payment. Alternatively, a facial feature with high usage frequency may not be arranged in the front, but different facial features are separately stored in different databases by using verification codes, thereby improving accuracy of facial recognition.

In another example, if the user forgets a verification code, the user can re-apply for setting a new verification code. For example, the payer can send a verification code reset request to the payment institution by using the intelligent terminal, and the data processing device of the payment institution can re-allocate a new verification code to the payer based on the verification code reset request. In addition, the facial feature of the payer is stored in a facial feature database corresponding to the new verification code, and a facial feature in the original facial feature database is deleted.

In another example, "verification codes and facial feature databases corresponding to the verification codes" can further be set for different merchants. For example, a certain merchant corresponds to N facial feature databases. Facial features of frequent visitors of the merchant can be stored in these databases, and verification codes allocated to the frequent visitors can be mapped to these facial feature databases. For example, when the payer applies for payment, a merchant ID of the merchant can be included in addition to the verification code. Based on the merchant ID, the data processing device of the payment institution can search for a facial feature database corresponding to the verification code in the N facial feature databases.

Figure 4:
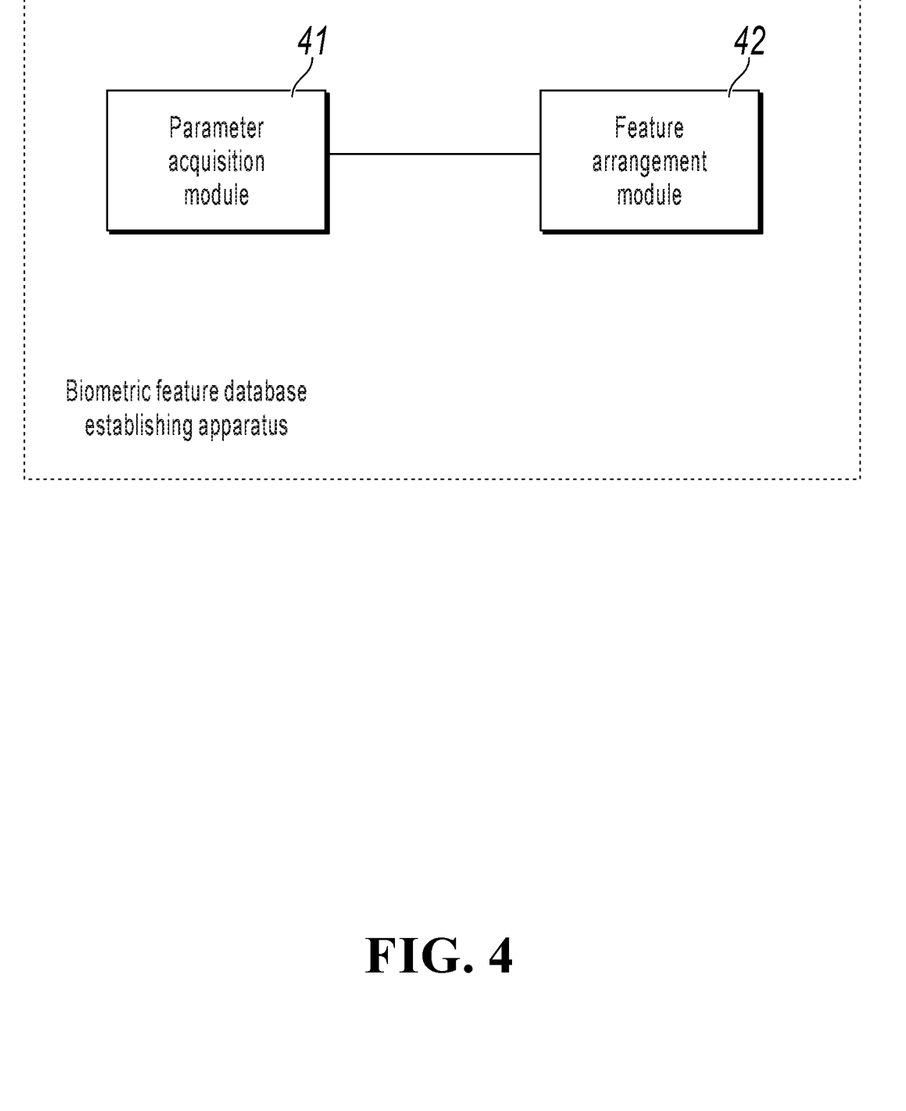
FIG. 4 is a structural diagram illustrating a biometric feature database constructing apparatus, according to one or more implementations of the present specification.

To implement the previous biometric feature database constructing method, one or more implementations of the present specification further provide a biometric feature database constructing apparatus. The apparatus can be, for example, the data processing device 11 of the payment institution in FIG. 2, so the data processing device 11 can execute the facial recognition payment method in the one or more implementations of the present specification. As shown in FIG. 4, the apparatus can include a parameter acquisition module 41 and a feature arrangement module 42.

The parameter acquisition module 41 is configured to obtain a usage frequency attribute of each biometric feature in a biometric feature database, where the usage frequency attribute is used to indicate matching success frequency of the biometric feature.

The feature arrangement module 42 is configured to arrange the biometric features in descending order of matching success frequency based on the usage frequency attribute, so a biometric feature with higher frequency is preferably used to perform recognition, matching, and comparison.

In an example, the parameter acquisition module 41 is configured to obtain at least one of the following attribute parameters of each biometric feature: the number of usage times and the latest usage time.

In an example, the feature arrangement module 42 is configured to perform weighted summation on the at least two attribute parameters to obtain a frequency attribute value when the usage frequency attribute includes at least two attribute parameters; and arrange the biometric features based on the frequency attribute value.

Figure 5:
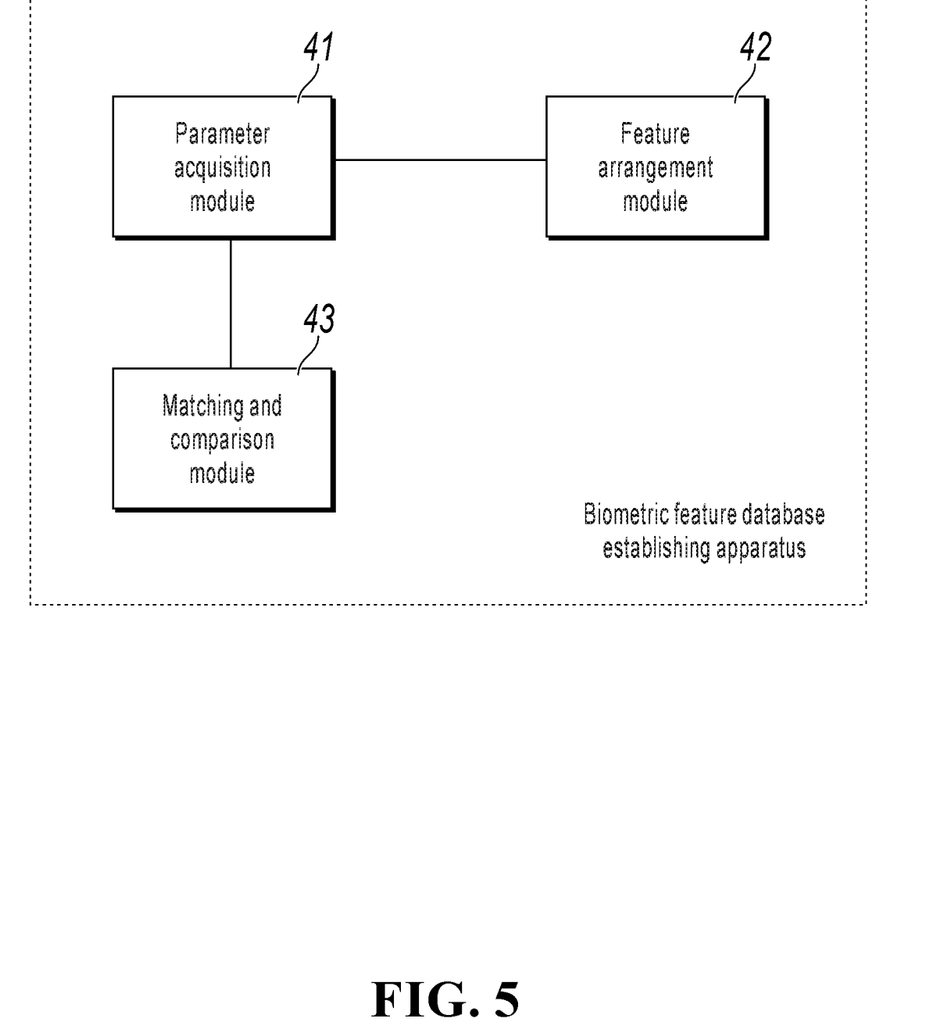
FIG. 5 is a structural diagram illustrating a biometric feature database constructing apparatus, according to one or more implementations of the present specification.

As shown in FIG. 5, the apparatus can further include a matching and comparison module 43, configured to compare the biometric features with a biometric feature that is recognized based on feature ranks in the biometric feature database, where a biometric feature with higher matching success frequency is preferably used to perform matching and comparison.

The parameter acquisition module 41 is further configured to update a usage frequency attribute of the biometric feature after a matched biometric feature is obtained.

The feature arrangement module 42 is further configured to rearrange the biometric features in the biometric feature database based on the updated usage frequency attribute.

The apparatuses or modules described in the previous implementations can be implemented by a computer chip or an entity or can be implemented by a product with a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of these devices.

For ease of description, the previous apparatus is described by dividing the functions into various modules. Certainly, in the one or more implementations of the present specification, a function of each module can be implemented in one or more pieces of software and/or hardware.

An execution sequence of the steps in the procedure shown in FIG. 3 is not limited to a sequence in the flowchart. In addition, descriptions of steps can be implemented in the form of software, hardware, or a combination thereof. For example, a person skilled in the art can implement the descriptions in the form of software code, and the code can be a computer executable instruction that can implement logical functions corresponding to the steps. When implemented in a software form, the executable instruction can be stored in a memory and executed by a processor in a device.

For example, corresponding to the previous method, the one or more implementations in the present specification provide a data processing device, and the device can be, for example, the data processing device 11 of the payment institution in FIG. 2. The device can include a processor, a memory, and a computer instruction. The computer instruction is stored in the memory and can run on the processor, and the processor executes the instruction to implement the following steps: obtaining a usage frequency attribute of each biometric feature in a biometric feature database, where the usage frequency attribute is used to indicate matching success frequency of the biometric feature; and arranging the biometric features in descending order of matching success frequency based on the usage frequency attribute, so a biometric feature with higher frequency is preferably used to perform recognition, matching, and comparison.

It is worthwhile to note that the term "include", "have", or their any other variant is intended to cover a non-exclusive inclusion, so a process, a method, a commodity, or a device that includes a series of elements not only includes those elements but also includes other elements that are not expressly listed, or further includes elements inherent to such process, method, commodity, or device. An element described by "includes a . . . " further includes, without more constraints, another identical element in the process, method, commodity, or device that includes the element.

A person skilled in the art should understand that the one or more implementations of the present specification can be provided as a method, a system, or a computer program product. Therefore, the one or more implementations of the present specification can be hardware only implementations, software only implementations, or implementations with a combination of software and hardware. Moreover, the one or more implementations of the present specification can use a form of a computer program product implemented on one or more computer-usable storage media (including but not limited to a magnetic disk memory, a CD-ROM, an optical memory, etc.) that include computer-usable program code.

The one or more implementations of the present specification can be described in the general context of an executable computer instruction executed by a computer, for example, a program module. Generally, the program module includes a routine, a program, an object, a component, a data structure, etc., for executing a particular task or implementing a particular abstract data type. The one or more implementations of the present specification can also be practiced in distributed computing environments. In the distributed computing environments, tasks are performed by remote processing devices that are connected through a communications network. In a distributed computing environment, the program module can be located in both local and remote computer storage media including storage devices.

The implementations in the present specification are described in a progressive way. For same or similar parts in the implementations, reference can be made to these implementations. Each implementation focuses on a difference from other implementations. Particularly, a data processing device implementation is similar to a method implementation, and therefore, is described briefly. For related parts, reference can be made to partial descriptions in the method implementation.

The implementations of the present specification are described above. Other implementations fall within the scope of the appended claims. In some cases, the actions or steps described in the claims can be performed in an order different from that in the implementations and the desired results can still be achieved. In addition, the process depicted in the accompanying drawings is not necessarily shown in a particular order to achieve the desired results. In some implementations, multitask processing and parallel processing can be performed or can be advantageous.

The previous descriptions are only example implementations of the one or more implementations of the present specification, but are not intended to limit one or more implementations of the present specification. Any modification, equivalent replacement, improvement, etc. made without departing from the spirit and principle of the one or more implementations of the present specification shall fall within the protection scope of the one or more implementations of the present specification.

Figure 6:
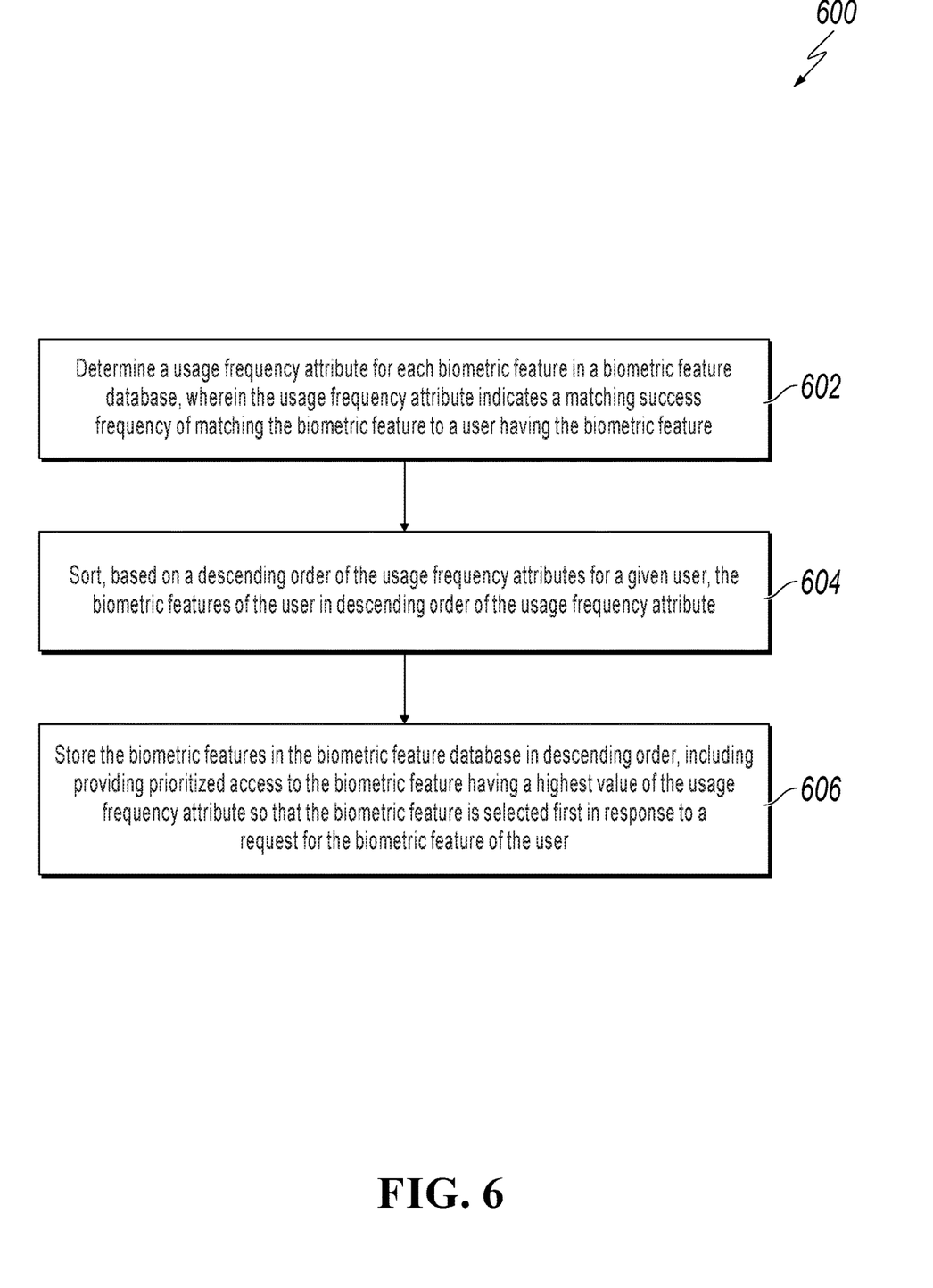
FIG. 6 is a flowchart illustrating an example of a computer-implemented method for identifying and providing prioritized access to biometric features based on usage frequency, according to an implementation of the present disclosure.

FIG. 6 is a flowchart illustrating an example of a computer-implemented method 600 for identifying and providing prioritized access to biometric features based on usage frequency, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a usage frequency attribute is determined for each biometric feature in a biometric feature database. The usage frequency attribute indicates a matching success frequency of matching the biometric feature to a user having the biometric feature. The biometric feature can be, for example, a facial feature. The matching success frequency can identify, for example, a number of times or a success percentage that facial recognition or other types of biometric techniques have matched a user to their biometric information.

In some implementations, the usage frequency attribute can be a mathematical function of at least one of a number of times that the biometric feature has been requested or a most recent usage time that the biometric feature was matched. For example, a score can be mathematically computed that is based on usage frequencies or success rates. Scores can also be affected by how recently various types of biometric features have led to matches. From 602, method 600 proceeds to 604.

At 604, the biometric features of the user are sorted in descending order of the usage frequency attribute. The sorting can be based, for example, on a descending order of the usage frequency attributes for a given user.

In some implementations, sorting the biometric features of the user in descending order of the usage frequency attribute can include a use of weighted summations for the sorting. For example, a weighted summation can be performed on at least two usage frequency attributes for biometric features to obtain a frequency attribute value when the usage frequency attribute comprises at least two usage frequency attributes. In some implementations, a weighted summation can be performed on at least two attribute parameters included in the usage frequency attribute, such as the number of usage times and the latest usage time. A value obtained through weighted summation can be referred to as a frequency attribute value. The biometric features can then be sorted based on the weighted summation. From 604, method 600 proceeds to 606.

At 606, the biometric features in the biometric feature database are stored in descending order. The storing includes providing prioritized access to the biometric feature having a highest value of the usage frequency attribute so that the biometric feature is selected first in response to a request for the biometric feature of the user. After 606, method 600 stops.

In some implementations, method 600 can further include steps for comparing and rearranging biometric features. For example, a given biometric feature of the user can be compared with a given a biometric feature in the biometric feature database. A usage frequency attribute of the given biometric feature can be updated when a match is determined based on the comparison. The biometric features in the biometric feature database can be rearranged based on an updated usage frequency attribute. For example, the database can be tuned to cause the selection of high-success rate biometric features over less successful biometric features.

In some implementations, method 600 can further include steps for performing a payment based on a comparison of a facial feature. For example, a facial feature of a payer can be obtained. The obtained facial feature of a payer can be compared with the facial features in a facial feature database. When a matched facial feature is obtained, a payment is performed by using a payment account corresponding to the facial feature. For example, the person who is about to pay for an order (or pick up an order) can be verified using biometric techniques.

In some implementations, method 600 can further include steps for determining a facial feature that is to be used based on a verification code. For example, a verification code allocated to the payer can be obtained from different verification codes that are allocated to different payers. A particular facial feature database to be used for comparing facial features can be determined based on the verification code and from a set of facial feature databases. For example, the facial features of a customer who is about to complete a transaction can be checked based on a verification code associated with one or more of the customer and the transaction. The verification code can be supplied by the customer, scanned by scanners in the vicinity of the customer, obtained from the Internet, or provided in some other way.

The present disclosure describes techniques for identifying and providing prioritized access to biometric features based on usage frequency and success rates. For example, not all biometric features have the same success rate or usage frequency during the process of verifying or identifying a human being, such as a user, a customer, or an employee. A higher success rate and improved security can be achieved if, for example, highest-frequency or highest-success rate biometric features are arranged in the database for prioritized selection over less effective biometric features.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   constructing a mapping relationship between first biometric feature data and a first account of a first user from a first user device;
   generating a first verification code corresponding to the first user, wherein the first verification code comprises a plurality of numbers;
   storing the first biometric feature data in a first biometric feature database corresponding to a hash value;
   determining a first usage frequency attribute for the first biometric feature data in the first biometric feature database, wherein the first usage frequency attribute indicates a matching success frequency of matching the first biometric feature data to the first user and, in part, is computed using a function operating on a first value and a second value;
   sorting biometric features of the first biometric feature database, based on a descending order of the first usage frequency attribute corresponding to the first biometric feature data and one or more previously determined usage frequency attributes stored in the first biometric feature database;
   receiving the first verification code and second biometric feature data corresponding to a service request;
   calculating the hash value based on the first verification code;
   determining, based on the hash value, the first biometric feature database to be used for verifying the second biometric feature data;
   matching the second biometric feature data with the first biometric feature data, wherein the first biometric feature data is selected based on the first usage frequency attribute being greater than the one or more previously determined usage frequency attributes stored in the first biometric feature database; and
   based on matching the second biometric feature data with the first biometric feature data, generating output corresponding to the service request.

2. The computer-implemented method of claim 1, wherein the first value represents successful matches between the first biometric feature data and the second value represents a most recent successful match between the first biometric feature data and the first user.

3. The computer-implemented method of claim 1, wherein the function operating on the first value and the second value comprises:
   performing a weighted summation on the first value and the second value to obtain the first usage frequency attribute; and
   sorting the biometric features based on the weighted summation.

4. The computer-implemented method of claim 1, further comprising:
   updating the first usage frequency attribute of the first biometric feature data when a successful match is determined; and
   rearranging the biometric features in the first biometric feature database based on updating the first usage frequency attribute.

5. The computer-implemented method of claim 1, wherein the first biometric feature data is a facial feature.

6. The computer-implemented method of claim 1, wherein generating output corresponding to the service request comprises:
   performing a payment by using a payment account corresponding to the second biometric feature data.

7. The computer-implemented method of claim 1, wherein the first biometric feature data is a facial feature.

8. The computer-implemented method of claim 1, wherein the first biometric feature data is a facial feature.

9. The computer-implemented method of claim 1, wherein the hash value is calculated by a hash function that receives as input the plurality of numbers of the first verification code.

10. A non-transitory, computer-readable medium storing one or more instructions executable by a computer system to perform operations comprising:
   constructing a mapping relationship between first biometric feature data and a first account of a first user from a first user device;
   generating a first verification code corresponding to the first user, wherein the first verification code comprises a plurality of numbers;
   storing the first biometric feature data in a first biometric feature database corresponding to a hash value;
   determining a first usage frequency attribute for the first biometric feature data in the first biometric feature database, wherein the first usage frequency attribute indicates a matching success frequency of matching the first biometric feature data to the first user and, in part, is computed using a function operating on a first value and a second value;
   sorting biometric features of the first biometric feature database, based on a descending order of the first usage frequency attribute corresponding to the first biometric feature data and one or more previously determined usage frequency attributes stored in the first biometric feature database;
   receiving the first verification code and second biometric feature data corresponding to a service request;
   calculating the hash value based on the first verification code;
   determining, based on the hash value, the first biometric feature database to be used for verifying the second biometric feature data;
   matching the second biometric feature data with the first biometric feature data, wherein the first biometric feature data is selected based on the first usage frequency attribute being greater than the one or more previously determined usage frequency attributes stored in the first biometric feature database; and
   based on matching the second biometric feature data with the first biometric feature data, generating output corresponding to the service request.

11. The non-transitory, computer-readable medium of claim 10, wherein the first value represents successful matches between the first biometric feature data and the second value represents a most recent successful match between the first biometric feature data and the first user.

12. The non-transitory, computer-readable medium of claim 10, wherein the function operating on the first value and the second value comprises:
   performing a weighted summation on the first value and the second value to obtain the first usage frequency attribute; and
   sorting the biometric features based on the weighted summation.

13. The non-transitory, computer-readable medium of claim 10, further comprising:
   updating the first usage frequency attribute of the first biometric feature data when a successful match is determined; and
   rearranging the biometric features in the first biometric feature database based on updating the first usage frequency attribute.

14. The non-transitory, computer-readable medium of claim 10, wherein generating output corresponding to the service request comprises:
   performing a payment by using a payment account corresponding to the second biometric feature data.

15. The non-transitory, computer-readable medium of claim 10, wherein the hash value is calculated by a hash function that receives as input the plurality of numbers of the first verification code.

16. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      constructing a mapping relationship between first biometric feature data and a first account of a first user from a first user device;
      generating a first verification code corresponding to the first user, wherein the first verification code comprises a plurality of numbers;
      storing the first biometric feature data in a first biometric feature database corresponding to a hash value;
      determining a first usage frequency attribute for the first biometric feature data in the first biometric feature database, wherein the first usage frequency attribute indicates a matching success frequency of matching the first biometric feature data to the first user and, in part, is computed using a function operating on a first value and a second value;
      sorting biometric features of the first biometric feature database, based on a descending order of the first usage frequency attribute corresponding to the first biometric feature data and one or more previously determined usage frequency attributes stored in the first biometric feature database;
      receiving the first verification code and second biometric feature data corresponding to a service request;
      calculating the hash value based on the first verification code;
      determining, based on the hash value, the first biometric feature database to be used for verifying the second biometric feature data;
      matching the second biometric feature data with the first biometric feature data, wherein the first biometric feature data is selected based on the first usage frequency attribute being greater than the one or more previously determined usage frequency attributes stored in the first biometric feature database; and based on matching the second biometric feature data with the first biometric feature data, generating output corresponding to the service request.

17. The computer-implemented system of claim 16, wherein the first value represents successful matches between the first biometric feature data and the second value represents a most recent successful match between the first biometric feature data and the first user.

18. The computer-implemented system of claim 16, wherein the function operating on the first value and the second value comprises:

performing a weighted summation on the first value and the second value to obtain the first usage frequency attribute; and sorting the biometric features based on the weighted summation.

19. The computer-implemented system of claim 16, further comprising:

updating the first usage frequency attribute of the first biometric feature data when a successful match is determined based on the comparison; and rearranging the biometric features in the first biometric feature database based on updating the first usage frequency attribute.

20. The computer-implemented system of claim 16, wherein generating output corresponding to the service request comprises:

performing a payment by using a payment account corresponding to the second biometric feature data.

* * * * *

UNITED STATES PATENT AND TRADEMARK OFFICE
CERTIFICATE OF CORRECTION

PATENT NO. : 10,789,593 B2
APPLICATION NO. : 16/048573
DATED : September 29, 2020
INVENTOR(S) : Fen Zhai et al.

Page 1 of 1

It is certified that error appears in the above-identified patent and that said Letters Patent is hereby corrected as shown below:

In the Claims

Column 17, Line 24, In Claim 19, after "determined" delete "based on the comparison"

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*